(12) United States Patent
Kallevig

(10) Patent No.: US 7,458,588 B2
(45) Date of Patent: Dec. 2, 2008

(54) RIDER PLATFORM FOR SELF-PROPELLED VEHICLE

(76) Inventor: Bruce E. Kallevig, 307 Chelsea Rd., Monticello, MN (US) 55362

( * ) Notice: Subject to any disclaimer, the term of this patent is extended or adjusted under 35 U.S.C. 154(b) by 64 days.

(21) Appl. No.: 11/222,279

(22) Filed: Sep. 8, 2005

(65) Prior Publication Data
US 2006/0103093 A1 May 18, 2006

Related U.S. Application Data

(60) Provisional application No. 60/609,206, filed on Sep. 10, 2004.

(51) Int. Cl.
B62D 63/00 (2006.01)

(52) U.S. Cl. .............. 280/32.7; 280/288.4; 280/304.1; 280/727; 172/433; 172/434

(58) Field of Classification Search .............. 280/32.5, 280/32.7, 79.11, 288.4, 304.1, 639, 641, 280/656, 727; 172/433, 434
See application file for complete search history.

(56) References Cited

U.S. PATENT DOCUMENTS

| | | | | |
|---|---|---|---|---|
| 3,485,314 A * | 12/1969 | Herr | ............... | 180/19.1 |
| 4,096,920 A * | 6/1978 | Heyn | ............... | 180/11 |
| 4,750,578 A * | 6/1988 | Brandenfels | ............... | 180/13 |
| 4,989,351 A | 2/1991 | Shear | | |
| 5,413,364 A * | 5/1995 | Hafendorfer | ............... | 280/32.7 |
| 5,577,744 A * | 11/1996 | Parks | ............... | 280/32.6 |
| 5,653,466 A * | 8/1997 | Berrios | ............... | 280/760 |
| 5,697,623 A * | 12/1997 | Bermes et al. | ............... | 280/32.7 |
| 5,809,756 A | 9/1998 | Scag et al. | | |
| 5,882,020 A * | 3/1999 | Velke | ............... | 280/32.7 |
| 5,882,022 A * | 3/1999 | Convertini et al. | ............... | 280/47.38 |
| 5,927,730 A * | 7/1999 | Sattler | ............... | 280/47.131 |
| 5,947,505 A * | 9/1999 | Martin | ............... | 280/493 |
| 6,336,517 B1 * | 1/2002 | Cheng | ............... | 180/208 |
| 6,422,634 B2 * | 7/2002 | Lundh | ............... | 296/97.21 |
| 6,443,252 B1 * | 9/2002 | Andes | ............... | 180/65.1 |
| 6,485,036 B1 * | 11/2002 | Bricko | ............... | 280/32.7 |
| 6,488,291 B1 * | 12/2002 | Bellis, Jr. | ............... | 280/32.7 |
| 7,004,272 B1 * | 2/2006 | Brown et al. | ............... | 180/65.1 |
| 2001/0026055 A1 * | 10/2001 | Havener | ............... | 280/32.7 |
| 2003/0084653 A1 | 5/2003 | Velke et al. | | |
| 2004/0093840 A1 * | 5/2004 | Velke et al. | ............... | 56/15.8 |
| 2004/0145134 A1 | 7/2004 | Bares | | |

* cited by examiner

Primary Examiner—Christopher P Ellis
Assistant Examiner—Katy Meyer
(74) Attorney, Agent, or Firm—Dicke, Billig, & Czaja, P.L.L.C.

(57) ABSTRACT

A self-propelled vehicle comprises a frame and a platform pivotally mountable to a rear portion of the vehicle frame. The platform is pivotally movable between a first position in which the platform extends generally horizontally from the rear portion of the frame to support a rider during operation of the vehicle, and a second position in which the platform is removably secured in a generally upright position-adjacent the rear portion of the frame to enable walk-behind operation of the vehicle.

30 Claims, 12 Drawing Sheets

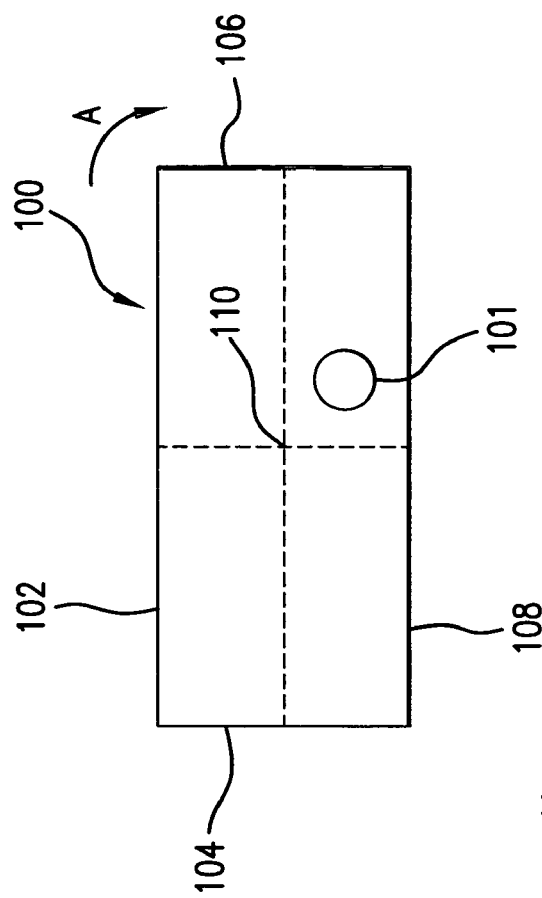
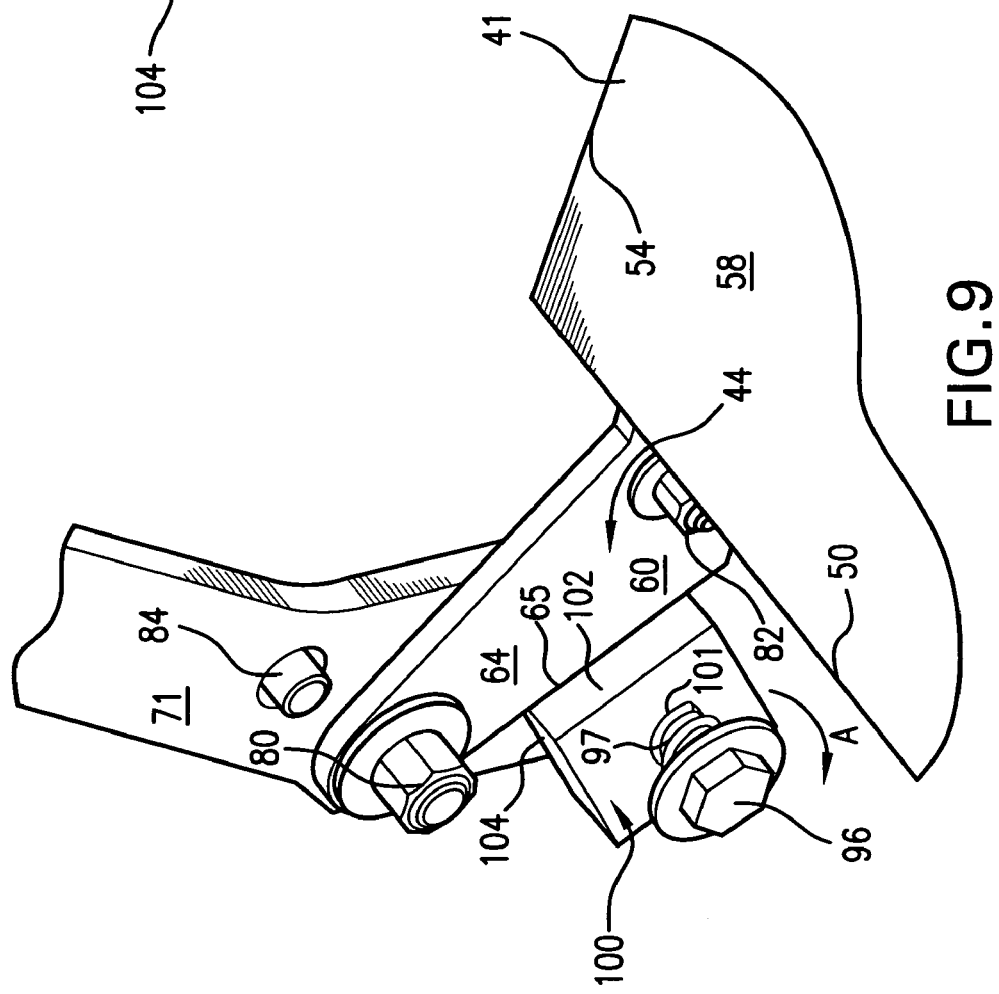
FIG.10
FIG.9

RIDER PLATFORM FOR SELF-PROPELLED VEHICLE

CROSS-REFERENCE TO RELATED APPLICATION

This patent application claims the benefit of the filing date of Provisional U.S. Patent Application Ser. No. 60/609,206, entitled "RIDER PLATFORM FOR SELF-PROPELLED VEHICLE," and having filing date of Sep. 10, 2004, which is incorporated herein by reference.

BACKGROUND

Skid steer loaders have become common in construction and materials handling because of their relatively small size, which lends great versatility and maneuverability. However, in some instances, even these skid steer loaders are too large. Accordingly, a smaller version of these loaders has been developed, which are generally known as self-propelled utility vehicles as well as walk-behind loaders, compact utility loaders, or mini skid steer loaders. These self-propelled vehicles are narrower, and more nimble, allowing the operator to negotiate tighter spaces. In these vehicles, instead of the operator sitting in the vehicle in a seat, the operator walks behind the loader and guides the loader with hand controls located at a rear of the loader. With the controls, the operator controls movement of the loader as well as operation of any attachments such as a loader, auger, bucket, etc. These walk-behind loaders also permit quick access and exit from control of the loader, since the operator need not sit or stand in an enclosure of the loader to operate the loader.

However, since the operator no longer rides on the loader, the operator may be forced to walk through substances, such as mud, dirt, or other materials over which the loader travels. In addition, when moving over uneven terrain or steep terrain, the operator is required to maintain stable footing and exert energy to keep up with the loader. This situation can impair the operator's ability to maintain their hands and arms at the controls of the loader, thereby diminishing the function of the self-propelled loader. Fatigue caused by this constant walking also can further impair hand control of the loader in a walk-behind position.

For these reasons, neither conventional skid-steer loaders nor conventional self-propelled utility vehicles meet all the challenges faced by operators of these vehicles.

SUMMARY

A self-propelled vehicle comprises a frame and a platform pivotally mountable to a rear portion of the vehicle frame. The platform is pivotally movable between a first position in which the platform extends generally horizontally from the rear portion of the frame to support a rider during operation of the vehicle, and a second position in which the platform is removably secured in a generally upright position adjacent the rear portion of the frame to enable walk-behind operation of the vehicle.

BRIEF DESCRIPTION OF THE DRAWINGS

FIG. 9 is an enlarged perspective view of a pivot mechanism and variably positionable stop mechanism of a platform system, according to another embodiment of the present invention.

FIG. 10 is schematic illustration of the variably positionable stop mechanism of the embodiment of FIG. 9, according to an embodiment of the present invention.

DETAILED DESCRIPTION

In the following detailed description, references made to the accompanying drawings, which form a part hereof, and which is illustrated by way of illustrations specific embodiments in which the invention may be practiced. In this regard, directional terminology, such as "front," "back," etc., is used with reference to the orientation of the figures(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention enable convertible use of self-propelled vehicles, such as mini skid steer loaders or compact utility loaders, in a walk-behind mode or in a ride-on-platform mode.

Figure 1:
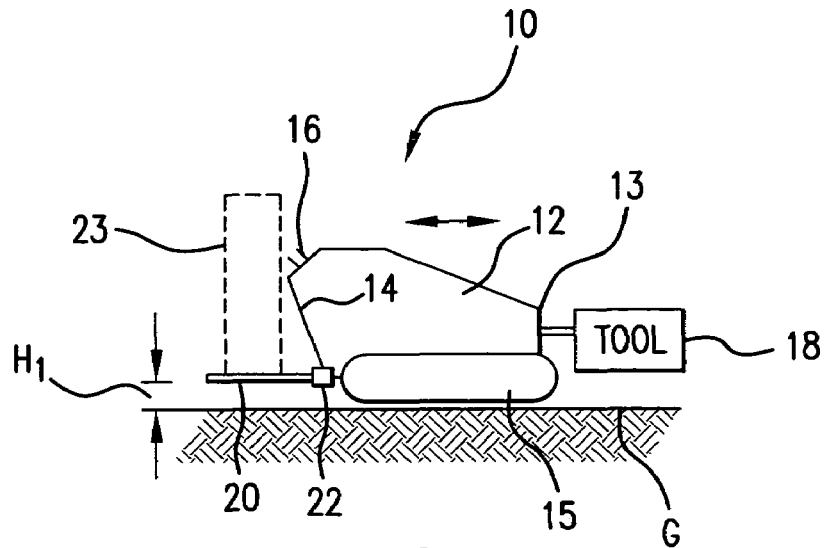
FIG. 1 is a side view schematically illustrating a self-propelled vehicle with a rider platform in an in-use position, according to an embodiment of the present invention.

FIG. 1 is a side view schematically illustrating a self-propelled vehicle 10, according to an embodiment of the present invention. As shown in FIG. 1, self-propelled vehicle 10 comprises vehicle frame 12 including front portion 13, rear portion 14, mover 15, and controls 16. In one embodiment, a tool 18 is removably attached to front portion 13 of vehicle frame 12. Mover 15 comprises powered wheels or tracks for moving vehicle 10 across ground G.

A platform 20 is mounted to rear portion 14 of vehicle frame 14 via pivot mechanism 22. Platform 20 defines an elevated operator zone 23 at rear portion 14 of vehicle 10 for operating controls 16. In the in-use position shown in FIG. 1, the operator can ride on the platform 20 above the ground (shown by distance H1) while operating the controls 16 of vehicle 10.

Figure 2:
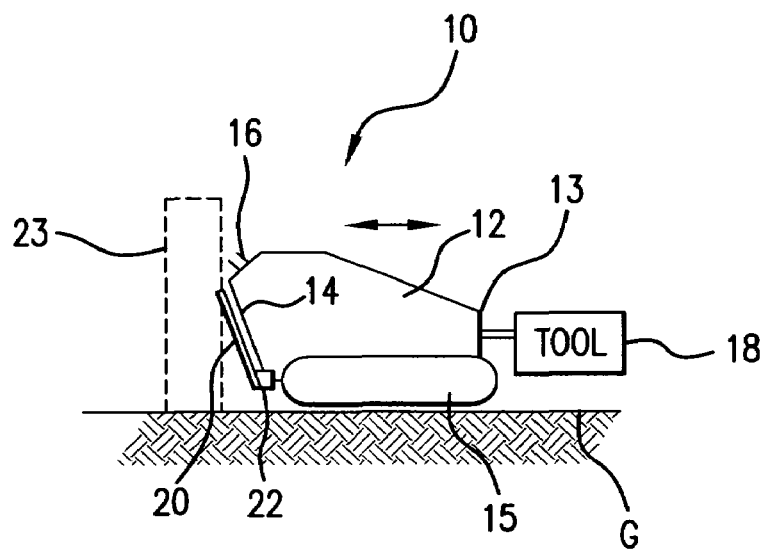
FIG. 2 is a side view schematically illustrating a self-propelled vehicle with a rider platform in a storage position, according to an embodiment of the present invention.

FIG. 2 is a side view of the embodiment of FIG. 1, except showing platform 20 in a storage position. In the storage position, platform 20 is pivoted via pivot mechanism 22 into a generally upright position and secured into close proximity to the rear portion 14 of the vehicle 10 to enable walk-behind use of vehicle 10. In the storage position, platform 20 enables unobstructed pedestrian operation of the self-propelled vehicle 10 in the walk-behind mode.

This pivotally mounted platform 20 can be constructed as a permanent feature of the self-propelled vehicle 10 or as retro-fit feature that is attached to a self-propelled vehicle not having a rider platform.

Riding on the platform 20 introduces greater feedback between movement of the vehicle/loader relative to the operator, since the platform 20 enables an operator to sense vehicle movement through their legs and feet, as well as through their hands at the controls 16. In addition, platform 20 places the operator at a greater height relative to the vehicle 10, enabling better line-of-sight to tool 18 (e.g., a loader bucket, auger, pallet fork, etc) at front portion 13 to enhance operator control of tool 18 and/or vehicle 10. Providing a ride-on platform 20 also enables the operator greater vision of the terrain to spot obstacles, people, and any objects to be manipulated by the vehicle 10. The operator also experiences less fatigue when riding on platform 20 than in a walk-behind mode since they are carried by the vehicle 10. Accordingly, many aspects of operating a self-propelled vehicle 10 are enhanced via the elevated operator zone 23 created by the rider platform 20.

Providing a ride-on platform 20 also enables the weight of the operator standing on the platform 20 to act as an additional counterweight on a self-propelled vehicle 10, thereby increasing the effective weight-bearing capacity of the vehicle at the front portion 13 of the vehicle frame 12. The weight of the operator also contributes to the function of the platform 20 as an anti-tipping measure, thereby limiting the extent of rearward rotation of vehicle 10. In particular, the additional effect of the long moment arm relative to a gravitational center of the vehicle (i.e., a fulcrum about which the front and rear of the vehicle tip relative to one another) that is provided by the operator standing on platform 20 multiplies the effect of the operator-provided counter-weight. Moreover, since the operator is not harnessed to a seat, the operator can quickly hop-on or hop-off the platform 20 to quickly add or subtract the counter weight. For example, the lifting capacity at the front portion 13 of the vehicle 10 can be increased when the self-propelled vehicle 10 is on a level surface (or a declining surface) by the operator hopping on the platform 20 at the rear portion 14 of the vehicle 10 to add a counter weight.

In another example, when the vehicle 10 is on an inclining surface, and the front portion 13 of the vehicle is not carrying a load, then the operator can hop off the platform 20 to limit the extent of backward tipping of the vehicle.

Providing a ride-on platform 20 also enhances tipping control of the vehicle by providing a structure capable of striking the ground, thereby limiting backward rotation of the vehicle 10 when the vehicle experiences loads or terrain that would otherwise cause the front portion 13 of the vehicle to rise in elevation significantly relative to the rear portion 14 of the vehicle. In one embodiment, rollers are attached to the vehicle frame (via a mounting frame of the platform) adjacent the rear portion 14 of the vehicle 10 to act an additional anti-tipping measure.

In one embodiment, pivot mechanism 22 also comprises a latch mechanism. The pivot mechanism 22 supports pivotal movement of the platform 20 relative to the rear portion 14 of the vehicle frame 12 between a generally horizontal in-use position (FIG. 1) and a generally upright storage position (FIG. 2). In one aspect, in the storage position of the platform, the latch mechanism is engaged to releasably secure platform 20 relative to rear portion 14 of the frame 12 to maintain platform 20 in a generally upright position, thereby enabling walk-behind use. In the in-use position, the latch mechanism is disengaged to release platform 20 relative to rear portion 14 of the frame 12, thereby allowing platform 20 to pivot downward to rest in a generally horizontal in-use position to receive a rider. To return the platform 20 to the storage position (FIG. 2), the platform 20 is pivotally rotated upward via pivot mechanism 22 toward the frame 12 until the latching mechanism is engaged to releasably secure the platform 20 relative to rear portion 14 of the frame 12.

Additional components and/or alternative components also comprise other embodiments of the invention. In one embodiment, the platform 20 is height-adjustable in the in-use position enabling the rider to be positioned at different heights relative to the controls 16 mounted at the rear portion 14 of the self-propelled vehicle 10. In another embodiment, a shock-absorbing connecting link is interposed between the platform 20 and the vehicle frame 12 to absorb the machine vibration to the operator when the platform 20 is in the riding in-use position, thereby minimizing operator fatigue. In another embodiment, the platform 20 includes a padded portion at its rear end and/or its sides to protect an operator or to protect nearby equipment and surroundings from contact with edges or corners of the platform. The padded portion comprises one or more layers or coatings of plastic, rubber, foam, or other cushioning materials. The padded portion also can comprise a non-slip surface.

Embodiments of the present invention also comprise variations on mechanisms for pivotally attaching a rider platform to a self-propelled vehicle. In one embodiment, platform 20 is mounted with two pivot mechanisms, with the pivot mechanisms located on opposite sides of the platform 20. In another embodiment, the pivot mechanism is located adjacent a central region of the platform between two opposite sides of the platform. In this embodiment, a single link pivotally connects the platform 20 to a rear portion 14 of the frame of the self-propelled vehicle 10 and includes a locking mechanism to enable securing the platform in either a generally horizontal in-use position or a generally upright storage position and to enable pivotal movement of the platform between the in-use and the storage position.

In one embodiment, the pivot mechanism and its associated latch mechanism are located adjacent each other at a side portion of the platform. In other embodiments, the pivot mechanism and its associated latch mechanism are located in separate positions from each other. In one aspect, one or more pivot mechanisms are located adjacent a side portion of the platform while one or more latch mechanisms are located adjacent a center portion of the platform. In another aspect, one or more pivot mechanisms are located adjacent a central portion of the platform while one or more latch mechanisms are located adjacent a side portion of the platform.

Embodiments of the invention enable a walk-behind use of the vehicle 10 without complete removal of platform 20 from vehicle 10 because of the low-profile of platform 20 in its storage position. Accordingly, in one embodiment, platform 20 supports an operator without any additional wheels or rollers mounted at an outer end of platform or underneath platform 20. However, in other embodiments, wheels, rollers, or skids are mountable at an outer end or bottom surface of platform 20 while still maintaining a low-profile of platform 20 in its storage position.

Figure 3:
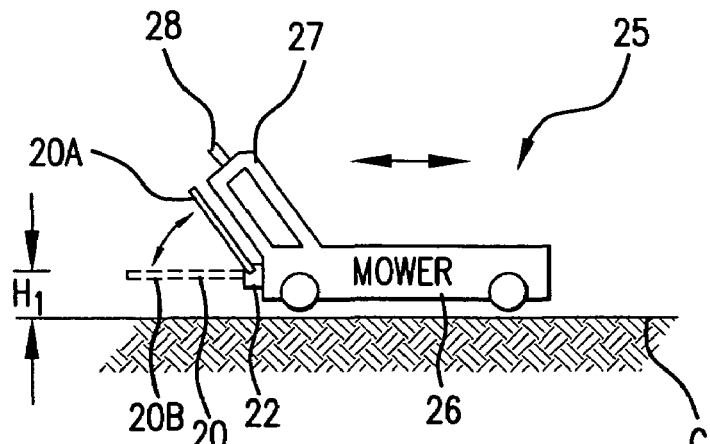
FIG. 3 is a side view schematically illustrating a self-propelled mower with a pivoting rider platform, according to an embodiment of the present invention.

FIG. 3 is a side view illustrating a self-propelled landscaping vehicle 25, such as a mower. As shown in FIG. 3, vehicle 25 comprises frame 26, handle 27, and controls 28. Vehicle 25 also comprises platform 20 which is movable via pivot mechanism 22 between an in-use position 20B and a storage position 20A. Platform 20 and pivot mechanism 22 of FIG. 3 comprise substantially the same features and attributes as platform 20 and pivot mechanism 22 of FIGS. 1-2, except for the replacement of vehicle 10 with vehicle 25.

These embodiments of the invention, and additional embodiments of the invention, are described in greater detail in association with FIGS. 4-17.

Figure 4:
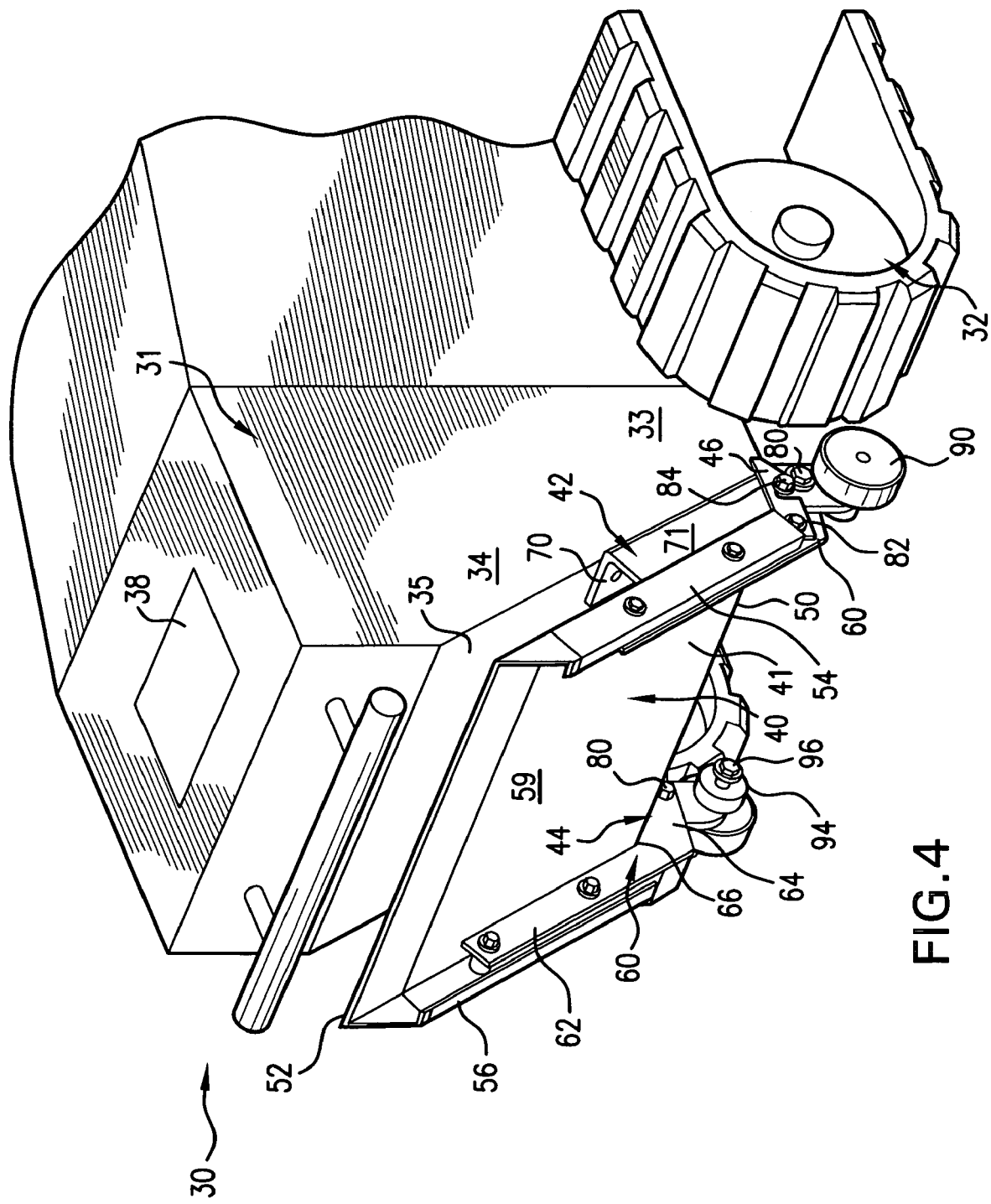
FIG. 4 is a perspective view of a self-propelled vehicle with a rider platform in a storage position, according to an embodiment of the present invention.
Figure 5:
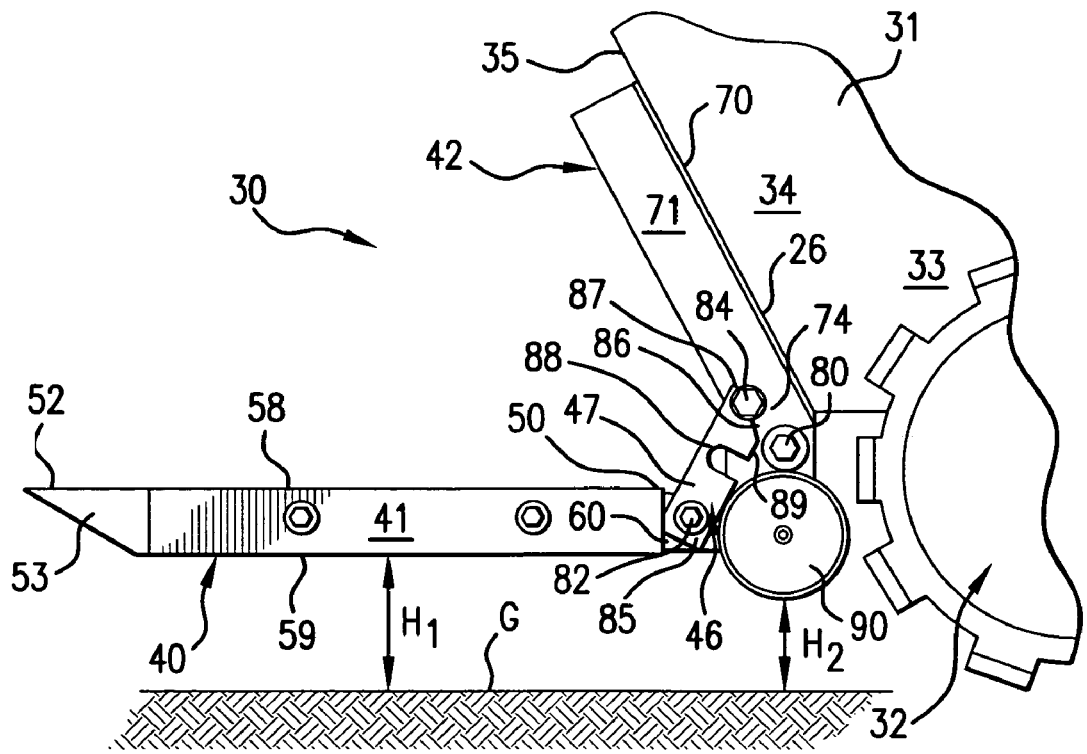
FIG. 5 is partial side view of a self-propelled vehicle with the rider platform in an in-use position, according to an embodiment of the present invention.
Figure 6:
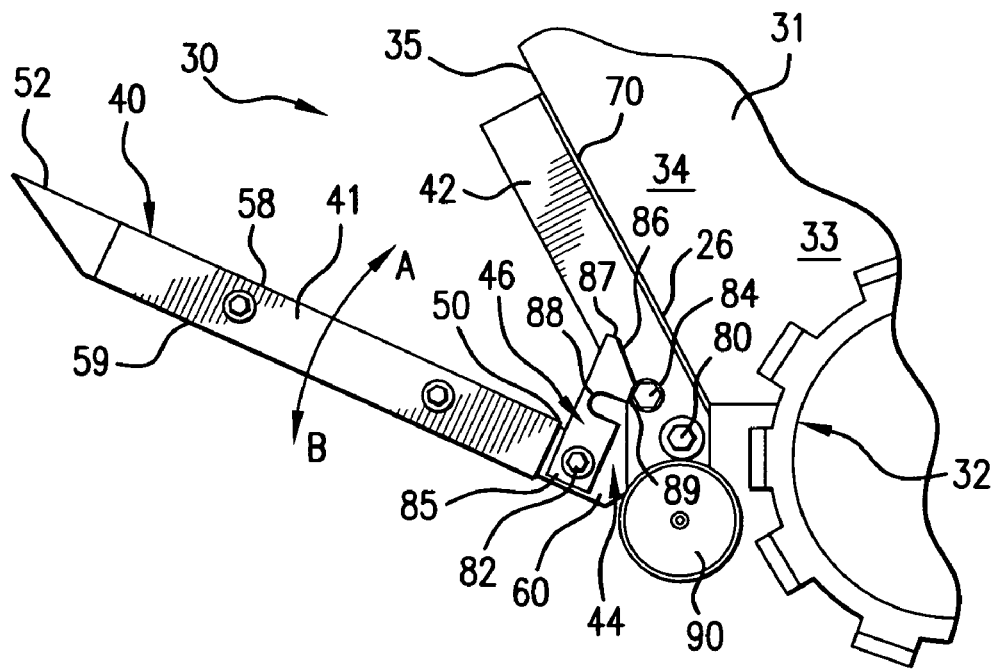
FIG. 6 is partial side view of the embodiment of FIG. 5 with the rider platform in an intermediate position, according to an embodiment of the present invention.
Figure 7:
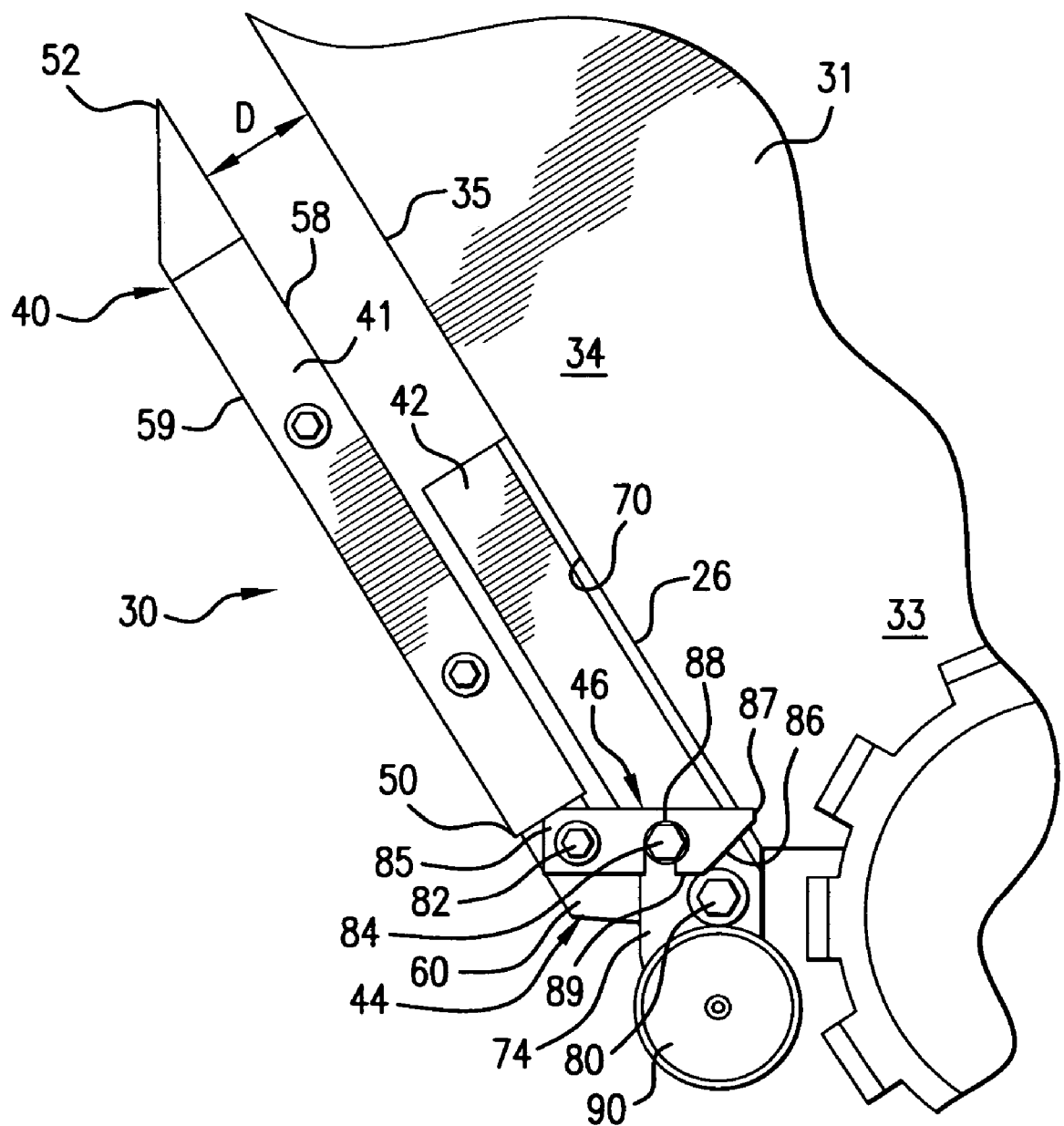
FIG. 7 is partial side view of the embodiment of FIG. 5 with the rider platform in a storage position, according to an embodiment of the present invention.

FIG. 4 is a perspective view of a platform system 40 of a self-propelled vehicle 30, according to an embodiment of the invention, including a rider platform 41 in a storage position. FIGS. 5-7 are side views of the platform system 40 of FIG. 4 showing the rider platform in an in-use position, an intermediate position, and a storage position, respectively, according to one embodiment of the invention. Various aspects and functions of platform system 40 are described together in association with FIGS. 4-7, which illustrate the same components in different views.

As shown in FIG. 4, vehicle 30 includes vehicle frame 31, mover 32, lower portion 33, rear portion 34 having rear surface 35 and a front portion substantially similar to front portion 13 in FIG. 1. The front portion enables removably securing various attachments such as loader buckets, pallet forks, augers, mowers, etc. Mover 32 comprises a drive mechanism such as power-driven wheels, tracks, etc. Vehicle 30 also includes control module 38 positioned at rear portion 34. Platform system 40 is removably attachable to vehicle frame 31, and once attached, enables pivotal movement of platform 41 between an in-use position (shown in FIG. 5) and a storage position (shown later in FIG. 7). In the in-use position, platform system 40 enables ride-on operation of vehicle 30. In the storage position, platform system 40 enables walk-behind operation of vehicle 30.

Platform system 40 defines platform 41 and is mounted to vehicle frame 31 via mounting bracket 42. Platform 41 is sized and shaped to support an operator standing upright, with some ability to maneuver their feet on the platform. As shown in FIG. 4, platform 41 is a generally rectangular shaped member. Platform 41 comprises inner end 50, outer end 52, first side 54, second side 56, upper support surface 58 (FIG. 5), and lower surface 59. Platform system 40 includes, for mounting on each of the opposite sides 54, 56 of platform 41, a pivot mechanism 44 and latch mechanism 46, as well as a mounting frame 42 to connect platform 41 to vehicle frame 31. The respective pairs of pivot mechanisms 44, latch mechanisms 46, and mounting frames 42 are laterally spaced apart at the rear portion 34 of vehicle by a distance generally corresponding to a width of rear portion 34. In another embodiment, the structure and function of mounting frame 42 is provided by vehicle frame 31 so that pivot mechanism 44 and latching mechanism 46 are directly coupled from platform 41 to vehicle frame 31 without a mounting frame 42.

Self-propelled vehicle 30 including platform system 40 is described and illustrated in greater detail in association with FIGS. 4-17.

As shown in FIGS. 4-7, mounting frame 42 is sized and shaped to enable pivot point 80 of pivot mechanism 44 to be located as close as possible to vehicle frame 31 with enough clearance for inner end 50 of platform 41 to rotate relative to rear surface 35 of vehicle frame 31 and for support surface 58 of platform 41 to be closely adjacent rear surface 35 of vehicle frame 31, when platform 41 is in its storage position. In one aspect, as shown in FIGS. 4-5, mounting frame 42 includes first portion 70 and second portion 71. First portion 70 of mounting frame 42 is fastened to rear surface 35 of vehicle frame 31 and second portion 71 extends outwardly from first portion 70 at an angle (e.g., 90 degrees) to enable mounting of pivot mechanism 44, latch mechanism 46, roller 90 and any other associated components of attachable platform 40 relative to mounting frame 42.

FIG. 4 also reveals aspects of pivot mechanism 44, including but not limited to, pivot arm 60, pivot point 80, and stop mechanism 94. As shown in FIG. 4, pivot arm 60 includes first portion 62 and second portion 64 forming a generally obtuse angle relative to each other at junction 66. First portion 62 of each pivot arm 60 is mounted to a respective first and second side (54, 56) of platform 41. Second portion 64 of each pivot arm 60 is pivotally mounted (at pivot point 80) to a respective mounting frame 42 on opposite sides of rear surface 26. Pivot point 80 is a point on mounting frame 42 about which pivot arm 60 of platform 41 pivots to move platform 41 between the in-use position (FIG. 5) and the storage position (FIGS. 4,7). Pivot point 80 comprises a combination of pin(s), hole(s), and fastener(s) adapted to enable second portion 64 of arm 60 to pivot relative to second portion 71 of mounting frame 42.

In one aspect, the length of first portion 62 and second portion 64 of pivot arm 60, relative to each other, and the angle formed between first portion 62 and second portion 64 are selected so that when platform 41 is pivotally mounted to vehicle frame 31 via pivot arm 60, pivot arm 60 enables extension of platform 41 in a generally horizontal resting position relative to the vehicle frame 31, and also permit adequate clearance for pivoting of inner end 50 of platform 41 relative to vehicle frame 31 to move platform 41 to its storage position (FIGS. 4 and 7). A variety of lengths of first portion 62 and second portion 64 and a variety of angles at junction 66 of pivot arm 60 can be used to achieve pivoting function depending upon the size and the geometry of vehicle frame 31. Accordingly, pivot arm 60 is not strictly limited to the shape and geometry shown in FIGS. 4-17.

As shown in FIGS. 4-5, stop mechanism 94 is secured to mounting frame 42, via spring-loaded fastener 96, generally below pivot point 80 to limit pivoting movement of arm 60. Stop mechanism 94 is further described in association with FIGS. 5-17.

FIGS. 4-7 also illustrate latch mechanism 46. Latch mechanism 46 selectively maintains platform 41 in the either storage position or the in-use position. As shown in FIG. 5, latch mechanism 46 comprises body 47, pivot point 82, first end 85, beveled surface 86, second end 87, recess 88, and flat surface 89. Pivot point 82 comprises a point of latch body 47 that is pivotally mounted relative to a portion of platform 41, or a pivot arm 60 of platform 41 (best seen in FIG. 4). Pivot point 82 comprises a combination of pin(s) and hole(s) enabling pivotal movement of latch body 47 adjacent first end 85 so that second end 87 swings in and out of releasable engagement with pin 84 of mounting frame 42. As shown in FIG. 5, in the in-use position in which platform 41 rests in a generally horizontal position, gravitational forces cause beveled surface 86 of latch body 47 to rest against pin 84 of mounting frame 42.

FIGS. 4-7 also illustrate roller 90, which is mounted to a lower portion of mounting frame 42 in one embodiment of the invention. In one aspect, roller 90 is positioned to make first contact with the ground in the event that vehicle 30 tips backward during ordinary use, thereby relieving pivot mechanism 44 and platform 41 from wear and tear due to ground contact, and helping to stabilize the rider on platform 41. Accordingly, roller 90 acts as a balancing mechanism for both the rider (standing in operator zone 23 of FIG. 1) and the vehicle 30 when maneuvering the vehicle 30 over an obstacle, uneven terrain, or steep terrain. As shown in FIG. 5, the bottom of roller 90 is positioned at a height H2 above the ground G at a height lower than the general operating height H1, at which a lower surface 59 of platform 41 generally extends above ground G. Accordingly, roller 90 is in position to generally strike the ground before platform 41 during a rearward tipping of vehicle frame 12.

In another embodiment, roller 90 is omitted from platform system 40.

While not shown in each Figure of FIGS. 4-17, it is understood that platform 40 of vehicle 30 comprises roller 90 in each embodiment, except where roller 90 is omitted selectively as desired by an operator, retailer, manufacturer, etc. In addition, a roller 90 is generally mounted on both sides of the platform (e.g. opposite sides of platform 41 at a respective mounting frame 42 as shown in FIGS. 4-5).

FIG. 6 is a side view of platform 40 in an intermediate position, during pivoting movement (represented by directional arrow A) between the generally horizontal in-use position (FIG. 5) and the generally upright storage position (FIG. 7), according to one embodiment of the invention. For discussion purposes, platform 41 is assumed to be moved upward from the in-use position toward the storage position. As shown in FIG. 6, outer end 52 of platform 41 is lifted upward with inner end 50 of platform 41 pivoting relative to pivot point 80, thereby causing beveled surface 86 of latch body 47 to slide upward against fixed pin 84 on mounting frame 42. This sliding motion continues as outer end 82 of platform 41 is pivotally raised upward so that flat surface 89 of latch body 47 begins to slide against pin 84. As shown in FIG. 6, when platform 41 becomes generally upright and generally parallel to rear surface 26 of vehicle frame 12, recess 88 of latch body 47 drops (by force of gravity) onto pin 84. In this position, the operator releases outer end 52 of platform 41 allowing gravity to exert downward forces against second end 52 of platform 41, with recess 88 of latch body 47 maintaining pressing engagement with pin 84 of mounting frame to prevent downward pivotal movement of platform 41.

FIG. 7 is a side view illustrating platform 41 in a generally upright storage position, according to one embodiment of the invention. As shown in FIG. 7, with recess 88 of latch body 47 resting securely on pin 84 of mounting frame 42, platform 41 is securely positioned close to rear surface 35 of vehicle frame 31 with support surface 58 spaced a short distance D from rear surface 35. The distance D can be selected to either larger or smaller than shown, and support surface 58 optionally need not be generally parallel to rear surface 35 of vehicle frame 31.

To restore platform 41 to its in-use position, the operator simply supports outer end 52 of platform 41 while lifting second end 87 of latch body 47 upward to withdraw recess 88 from its locked position on pin 84. As platform 41 is rotated downward to the in-use position, flat surface 89 and beveled surface 86 of latch body 47 slide against pin 84 (shown in FIG. 6) until platform 41, including latch mechanism 46, are returned to their in-use position (FIG. 5).

In one embodiment, pivot mechanism 44 and latch mechanism 46 are secured relative to platform 41 independent of each other. In another embodiment, pivot mechanism 44 and latch mechanism 46 can take several forms, in addition to those shown, including components such as fasteners, hooks, pivot members, pins, or holes, that reciprocally engage each other and that can be mounted on either the frame of the vehicle and/or the platform in various combinations to achieve the pivoting and latching functions described in association with FIGS. 1-17.

Figure 8:
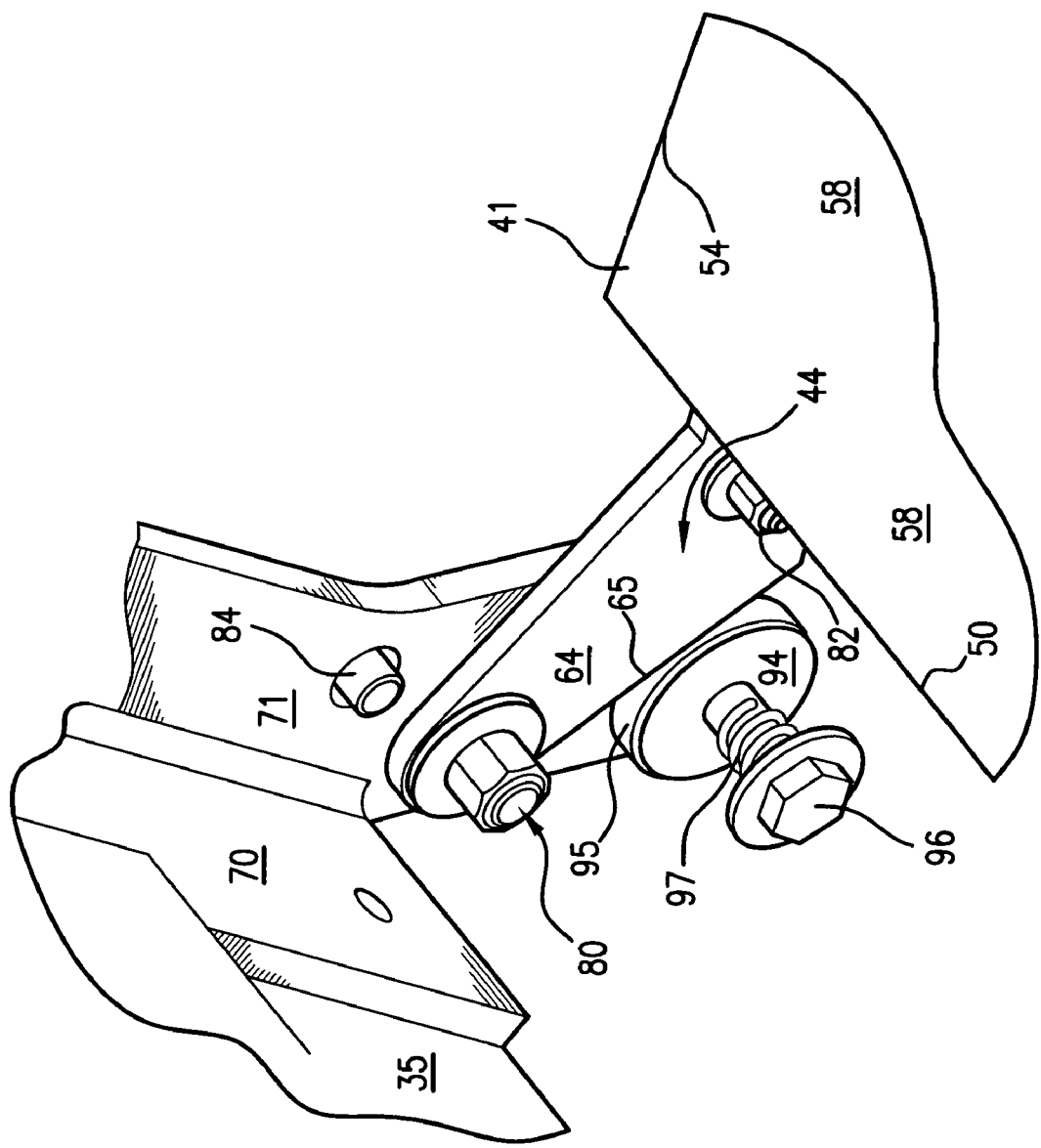
FIG. 8 is enlarged perspective view of a pivot mechanism and stop mechanism of a platform system, according to an embodiment of the present invention.

FIG. 8 is enlarged perspective view of platform 41 in its in-use position, further illustrating interaction between pivot mechanism 44 and stop mechanism 94. As shown in FIG. 8, second portion 64 of pivot arm 60 extends outwardly from underneath inner end 50 of platform 41 and up to pivot point 80. Contact surface 65 of second portion 64 rests against contact surface 95 of stop mechanism 94. Stop mechanism 94 prevents further pivotal movement of arm 60 relative to pivot point 80, thereby maintaining the position of platform 41 in a generally horizontal in-use position because of the relative angle of second portion 64 and first portion 62 of arm 60. Fastener 96 includes spring 97 and maintains stop mechanism 94 in position relative to mounting frame 42. As shown in FIG. 8, stop mechanism 94 is a generally disc shaped member.

In one embodiment, stop mechanism 94 is made from a hard material, such as a metal. In another embodiment, stop mechanism 94 is made from a generally elastic polymer material to thereby act as a shock-absorbing link between platform 41 and vehicle frame 31. This shock-absorbing link introduces a dampening effect between platform 41 and vehicle frame 31, thereby diminishing the amount of shock, dramatic forces, and/or vibrations transmitted from vehicle frame 31 to an operator on platform 41.

Moreover, this shock-absorbing link is not strictly limited to providing stop mechanism 94 as an elastomeric material, but can extend to other types of dampening materials, as well as other dampening and/or spring mechanisms and/or other suspension mechanisms, that are interposed between platform 41 and vehicle frame 31. The shock-absorbing parameters of this link, including a dampening parameter and spring rate, can be selected to vary the quantity and quality of the shock-absorbing link, including making a spring-based shock-absorbing link, either damped or undamped.

This shock-absorbing link can be independent of pivot mechanism 44 and stop mechanism 94, or can be a component of pivot mechanism 44 and/or stop mechanism 94.

A shock-absorbing link, according to one embodiment of the invention, is later described in association with FIG. 17.

FIG. 9 is an enlarged perspective view of platform 40 in its in-use position, illustrating another embodiment including a stop mechanism 100 (in place of stop mechanism 94) which enable platform 41 to be adjusted to different heights relative to vehicle frame 31 in the in-use position of platform 41. As shown in FIGS. 9-10, stop mechanism 100 includes a generally rectangular-shaped block having mounting hole 101, and four contact surfaces 102, 104, 106, and 108. As shown in FIG. 9, contact surface 102 of block 100 is positioned to receive pressing engagement from contact surface 65 of arm 60. However, fastener 96 enables selective rotation of block 100 into four different positions so that each of the other contact surfaces 104, 106 and 108 of block 100 can be pressingly engage contact surface 65 of pivot arm 60.

FIG. 10 is a schematic drawing, illustrating block 100 with its contact surfaces 102-108 and mounting hole 101. As shown in FIG. 10, mounting hole 101 is positioned off-center relative to both a major axis and a minor axis of block 100. This off-center positioning, in combination with the rectangular shape of block 100, results in each contact surface 102-108 causing contact surface 65 of pivot arm 60 to be supported at a different distance relative to fastener 96 on mounting frame 42, thereby causing platform 41 to be fixed at a different height relative to the ground for each of the different contact surfaces 102-108. While FIGS. 9-10 illustrate a generally rectangular-shaped block as stop mechanism 100, other shaped stop mechanisms (e.g., n-gon, triangular, etc) can be used to achieve desired variable height positioning of platform 41.

Figure 11:
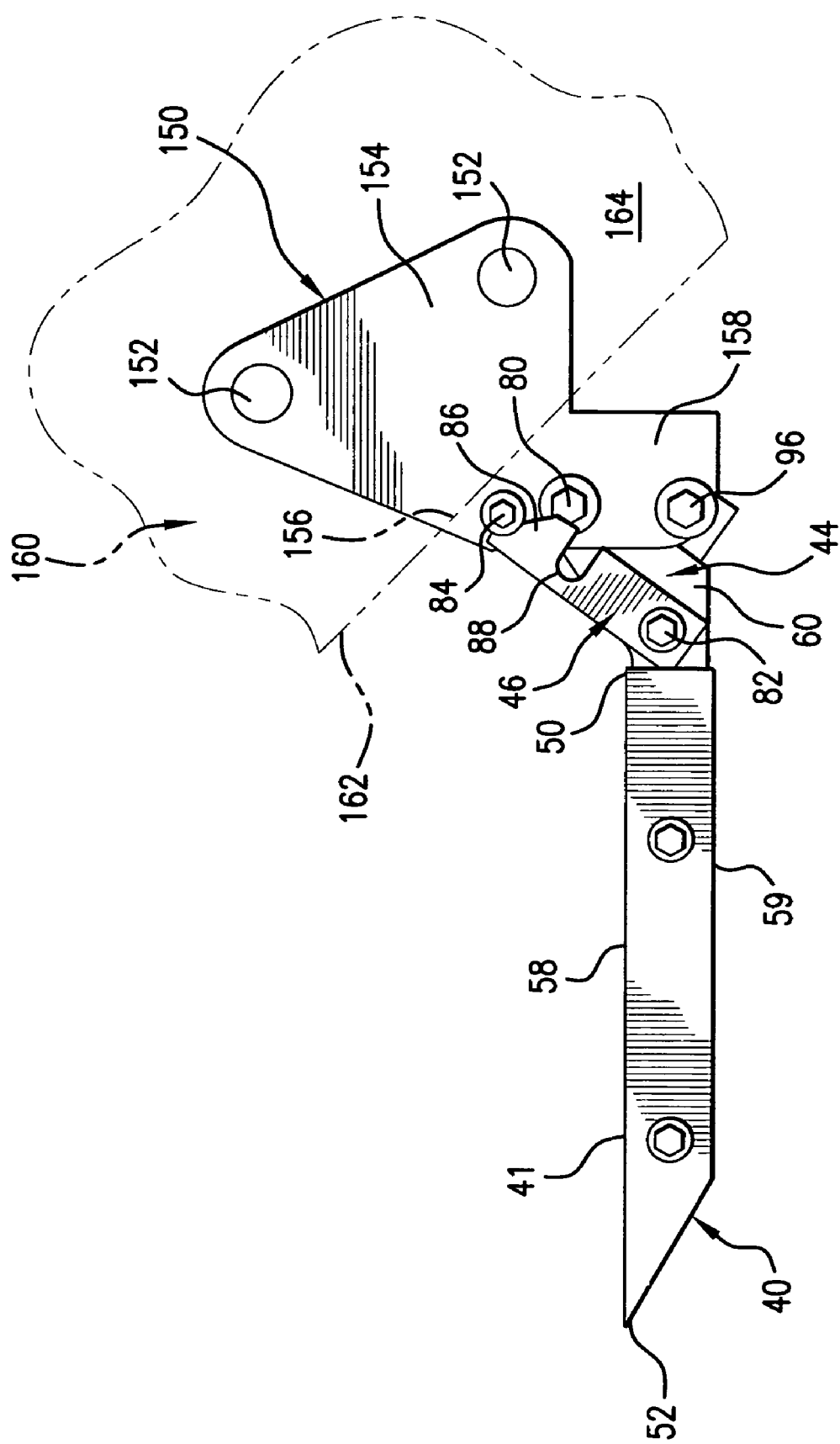
FIG. 11 is a side view of a platform system with an alternative mounting frame, according to an embodiment of the present invention.

FIG. 11 is a side view illustrating a self-propelled vehicle having a platform 41 (including pivot mechanism 44 and latch mechanism 46) having substantially the same features and attributes as vehicle 30, except replacing mounting frame 42 with mounting frame 150 to accommodate a different shape of vehicle frame 160 (similar to vehicle frame 31). As shown in FIG. 11, pivot mechanism 44 and latch mechanism 46 are mounted to mounting frame 150. Mounting frame 150 is fixed to a side surface 164 of vehicle frame 160 in contrast to mounting frame 42 which is fixed to rear surface 35 of vehicle frame 31 via portion 70 (FIGS. 4-7).

As shown in FIG. 11, mounting frame 150 comprises first body portion 154, holes 152 for mounting to vehicle frame 160, and second body portion 158. An imaginary line 156 generally denotes a boundary between first and second body portions 154, 158. First body portion 154 of mounting frame 150 is sized and shaped so that when fixed to a side surface 164 at the rear portion of vehicle frame 160, boundary 215 generally corresponds to a location of rear surface 162 of vehicle frame 160 (similar to rear surface 35 of vehicle frame 31) from which second body portion 158 extends. This arrangement enables mounting and functioning of pivot mechanism 44 and latch mechanism 46 at a pivot point 80 and fasteners 84, 96 in a position close to, but spaced from, rear surface 35 of vehicle frame 160 to achieve the functions and features previously described for platform 40 in association with mounting frame 42 (FIGS. 1-10).

Except for the different position of side-mounting frame 150 relative to vehicle frame 160 in FIG. 11 (as compared to the position of mounting frame 42 relative to vehicle frame 31 in FIGS. 4-7), all other features and attributes of platform system 40, including platform 41, pivot mechanism 44, and latch mechanism 46 of platform system 200 as illustrated in FIG. 11 are substantially the same as previously described in association with FIGS. 1-10.

Figure 12:
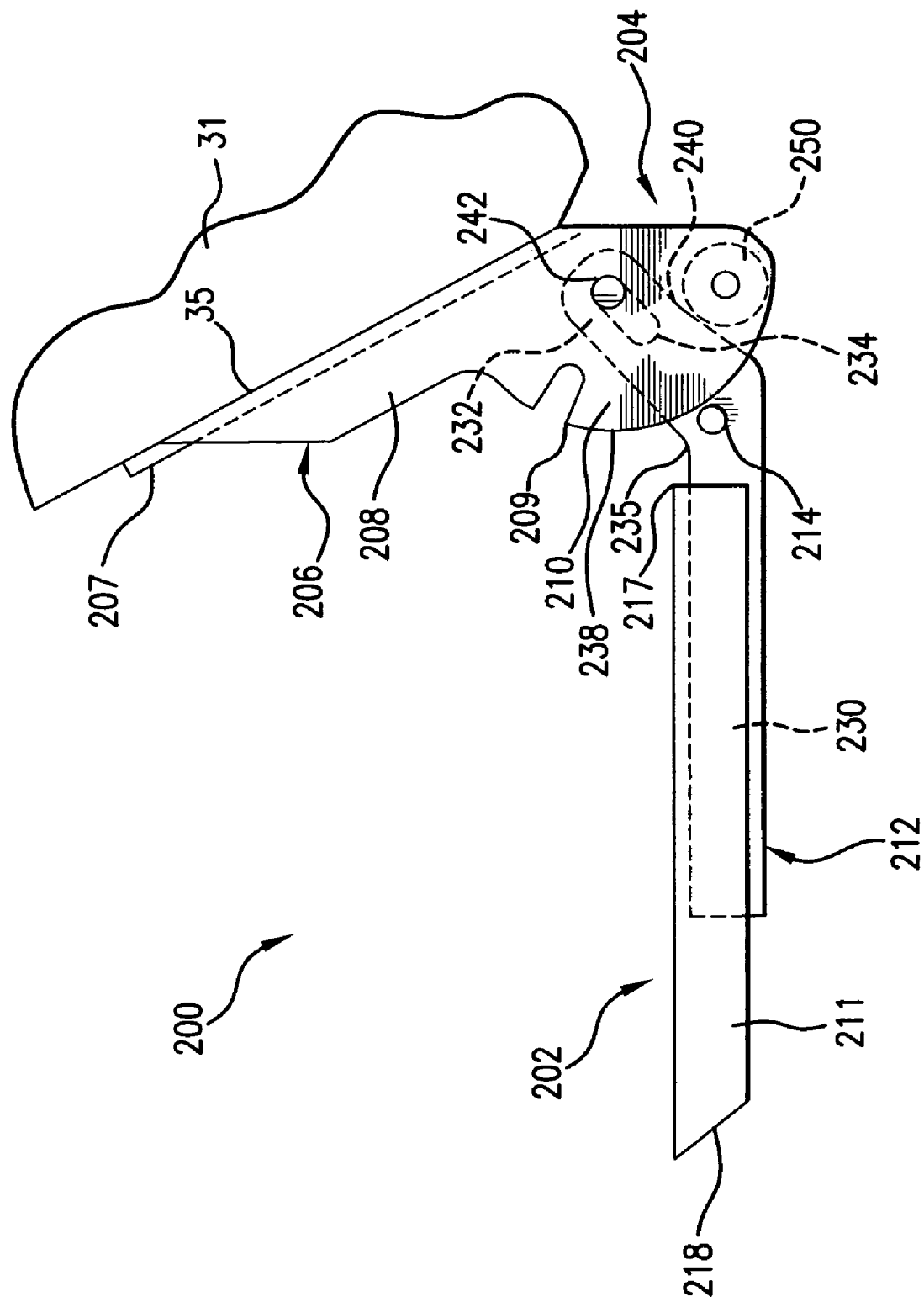
FIG. 12 is a side view of a rider platform in an in-use position, according to another embodiment of the present invention.

FIG. 12 is a side view illustrating a platform system 200, according to another embodiment of the invention. As shown in FIG. 12, platform system 200 comprises platform 202, pivot mechanism 204, and mounting frame 206. Platform 202 includes support plate 211 and comprises inner end 217 and outer end 218. Support arm 212 comprises outer end 230, secured to and supporting support plate 211, and inner end portion 232 which are joined together at junction 235 defining an generally obtuse angle between outer portion 230 and inner end portion 232. Mounting frame 206 comprises first portion 207, second portion 208, and lower portion 210 defining slot 209. Pivot mechanism 204 comprises components mounted on, or interacting with either platform 202 or mounting frame 206 to enable pivotal movement of platform 202 between in in-use position shown in FIG. 12 and a storage position shown later in FIG. 15.

As shown in FIG. 12, pivot mechanism 204 comprises pin 242 mounted on lower portion 210 of mounting frame 206 and slot 234 of inner end portion 232 of support arm 212. In one aspect, pivot mechanism 204 also comprises a securing mechanism comprising pin 214 mounted on support arm 212 and a slot 209 of lower portion 210 of mounting frame 206. Slot 234 of support arm 212 is generally elongate slot with closed ends, enabling sliding movement of inner end portion 232 of support arm 212 relative to pin 242. However, pin 214 which protrudes from support arm 212 is adjacent an outer edge 238 of lower portion 210 of mounting frame 206. In one aspect, pin 214 acts to prevent sliding movement of support arm 212 (and platform plate 211) inward toward rear surface 35 of the vehicle frame. Further interaction of the components of pivot mechanism 204 is described in association with FIGS. 13-16.

As shown in FIG. 12, stop mechanism 250 (shown in phantom) is secured to lower portion 210 of mounting frame 206 and limits movement of inner end portion 232 of support arm 212 via contact at surface 240 of support arm 212. Stop mechanism 250 comprises substantially the same features and attributes as stop mechanism 94, as previously described in association with FIGS. 1-11, and as further illustrated in FIG. 13.

Figure 13:
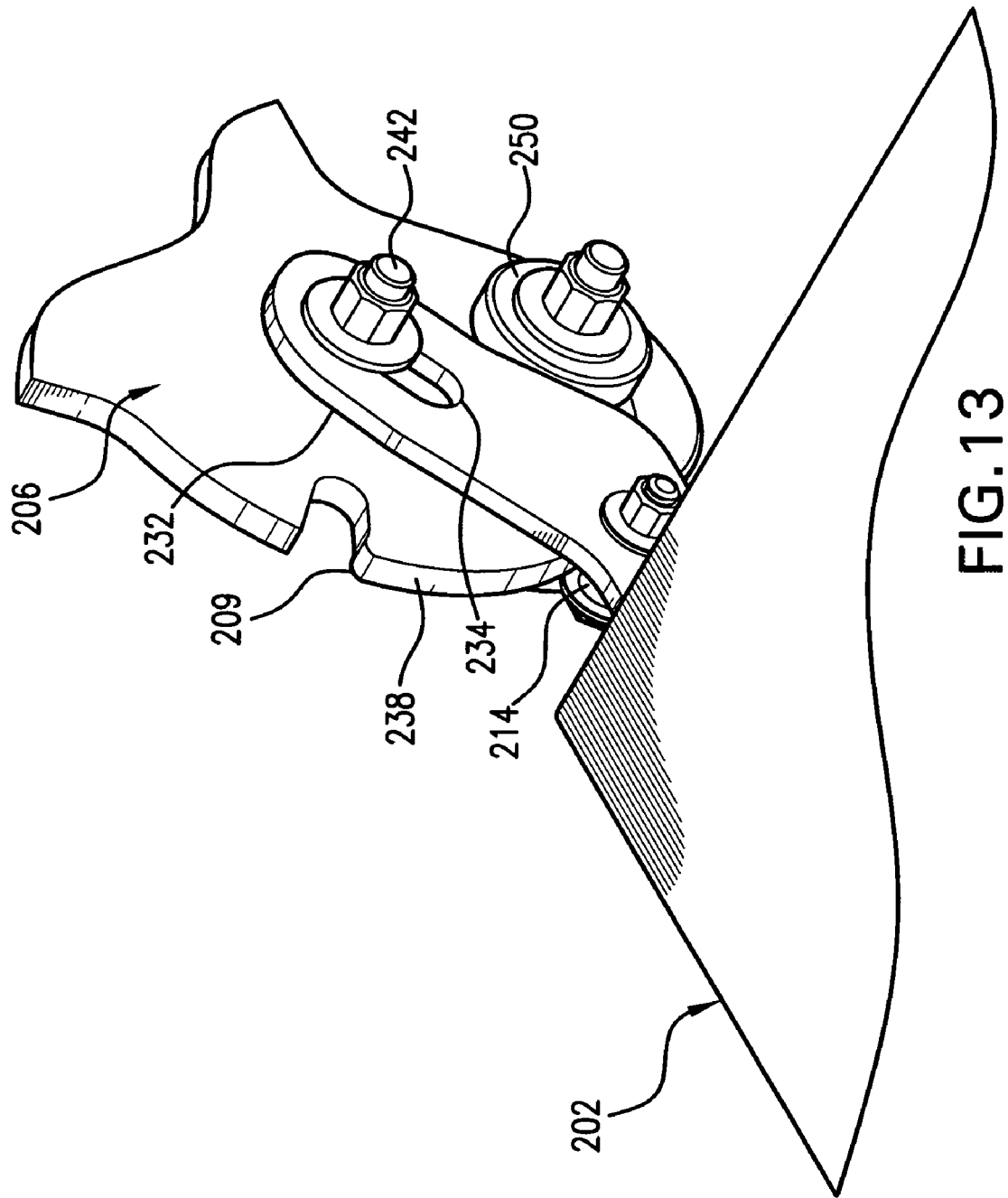
FIG. 13 is an enlarged perspective view of a pivot mechanism and a stop mechanism of the embodiment of FIG. 12, according to an embodiment of the present invention.

FIG. 13 is a perspective view of the embodiment of FIG. 12, which further illustrates the components of platform system 200 as described and illustrated in FIG. 12. As shown in FIG. 13, pin 242 protrudes through slot 234 of inner end portion 232 of arm 230 while pin 214 protrudes outwardly in a generally opposite direction to enable engagement with slot 209.

Figure 14:
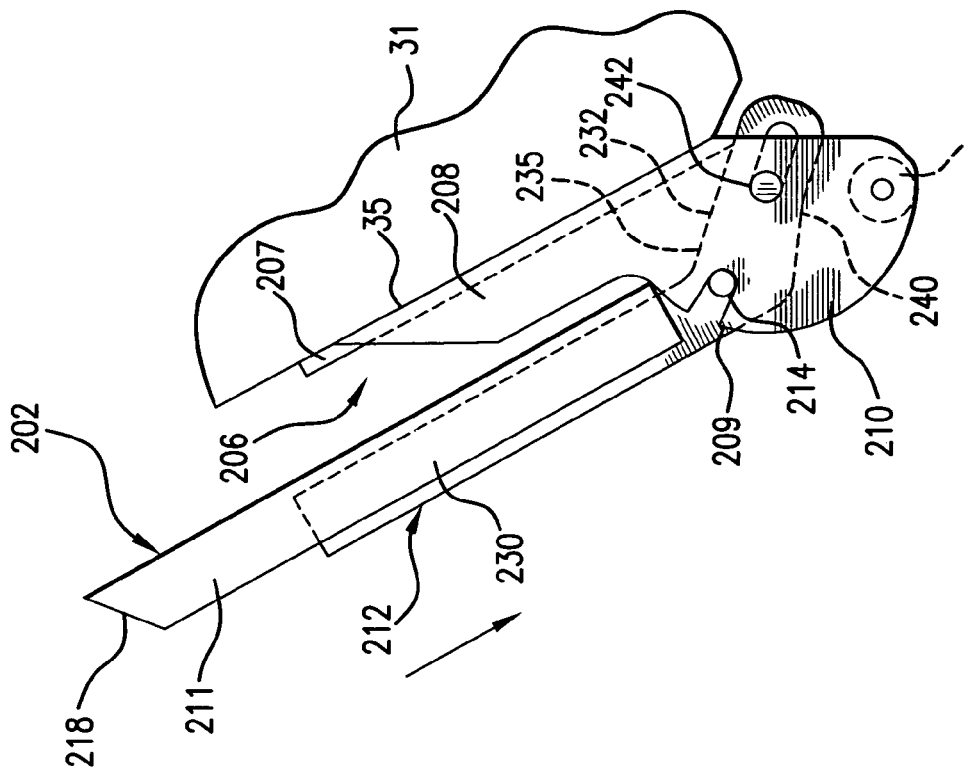
FIG. 14 is a side view of the embodiment of FIG. 12 with the rider platform in an intermediate position, according to an embodiment of the present invention.
Figure 15:
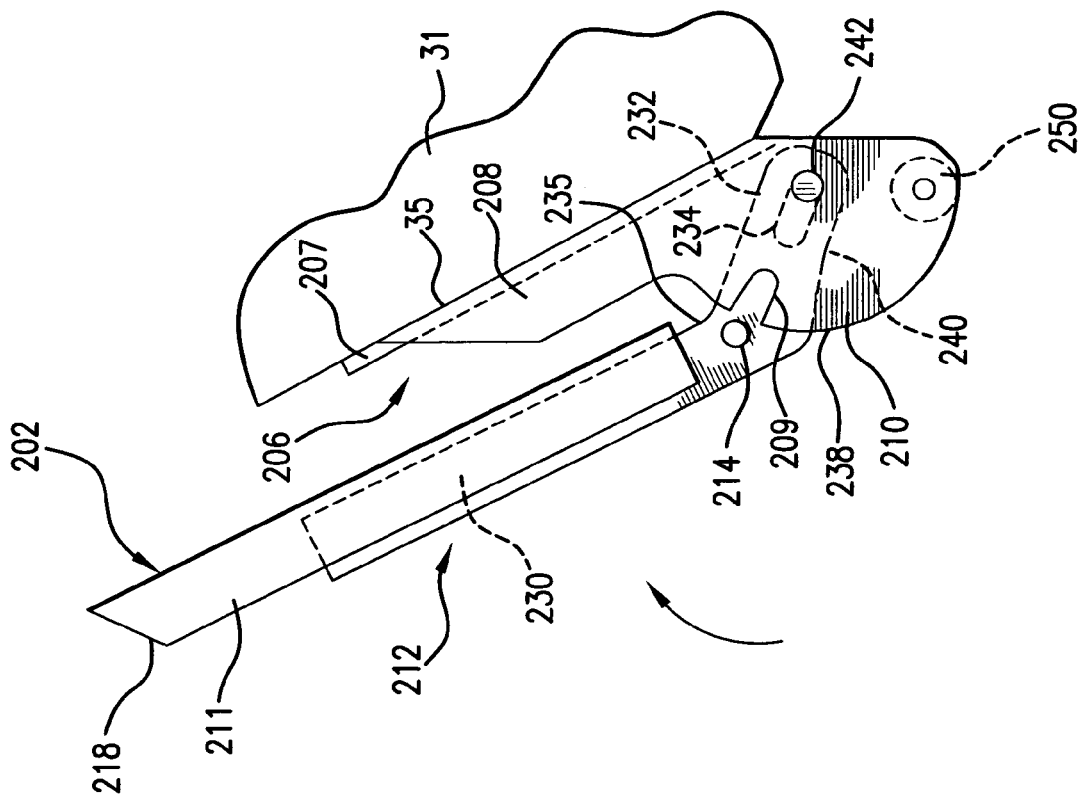
FIG. 15 is a side view of the rider platform of the embodiment of FIG. 12 in a storage position, according to an embodiment of the present invention.

FIG. 14 is a side view of the embodiment of FIGS. 12 and 13, according to one embodiment of the invention, illustrating the platform 202 in an intermediate position between an in-use position (FIG. 12) and a storage position (FIG. 15). As shown in FIG. 14, platform 202 is rotated upward from its in-use position (FIG. 12) via rotatable motion of slot 234 about pin 242, with pin 214 sliding along (or adjacent to) outer edge 238 of lower mounting portion 210, until pin 214 is positioned adjacent a mouth of slot 209. In this position, platform 202 is in a generally upright position. In one aspect, platform 202 is generally parallel to rear surface 35 of the vehicle frame, while in other aspects, the generally upright position is not exclusively limited to this generally parallel relation to rear surface 35 of the vehicle frame.

FIG. 15 is a side view of the embodiment of FIGS. 12-14, according to one embodiment of the invention, illustrating the platform 202 in a storage position. As shown in FIG. 15, platform 202 is moved inward with pin 214 of arm support 212 sliding into slot 209 of lower mounting portion 210, and with slot 234 of inner end portion 232 of arm support 212 sliding relative to pin 242. At the completion of this motion, pin 214 in slot 209 releasably secures platform in position adjacent to rear surface 35 of vehicle frame 31 with slot 234 and pin 242 providing an additional mechanism to maintain the position of platform 202. Accordingly, two simultaneous pin-in-slot movements of pin 214 and slot 209, and of pin 242 in slot 234, occur to secure platform 202 relative to rear surface 35 of the vehicle frame.

At any time desired by the operator, the platform is returned to the in-use position by pulling outer end 218 of platform 202 outward to slidably remove pin 214 from slot 209, with slot 234 of inner end portion 232 sliding relative to pin 242, until pin 214 exits slot 209. In this position, platform 202 is free to rotate downward to the in-use position shown in FIGS. 12-13, in which stop mechanism 250 supports inner end portion 232 of arm 212 at surface 240, and pin 214 limits inward/outward motion of platform 202 relative to the rear surface 35 of the vehicle frame.

In one aspect, in both the in-use position and the storage position, the securing pin 214 and latching slot 209 are laterally spaced further away from the rear surface 35 of the vehicle frame 31 relative to the pivot pin 242. In another aspect, in the in-use position, the securing pin 214 is positioned lower than the pivot pin 242, by virtue of angled inner end portion 232 of support arm 212, and in the storage position, the securing pin 214 is positioned vertically above the pivot pin 242.

This arrangement enables movement of only a single platform assembly (including platform 202, arm 212 including slot 234, and pin 214), relative to a mounting frame (including slot 209 and pin 242). In use, the first slot 234 remains both slidably and pivotally engaged to the second pin 242 while the first pin 214 is releasably slidable into the second slot 209 upon rotation of the entire platform 202. According, the platform assembly itself effectively acts as the only moving part to enable pivotal movement of platform 202 between the in-use and the storage position and to enable securing the platform 202 in the storage position.

In one aspect, platform system 200 uses the force of gravity to maintain the position of the platform 202. In the storage position, since the securing pin 214 and receiving slot 209 are above the pivot pin 242, and slot 209 is angled parallel to rear surface 35, once pin 214 is aligned within slot 209, gravity assists a user in pushing pin 214 into slot 209 and in maintaining pin 214 in slot 209. When released from the storage position by pulling platform 202 outward to remove pin 214 from slot 209, gravity tends to cause platform 202 rotate downward relative to pivot pin 242, with stop mechanism 250 preventing any further movement of platform 202. Accordingly, the arrangement of pins and slots of platform system 200 enables the natural force of gravity to facilitate positioning of platform 202 in its respective storage and in-use positions.

Figure 16:
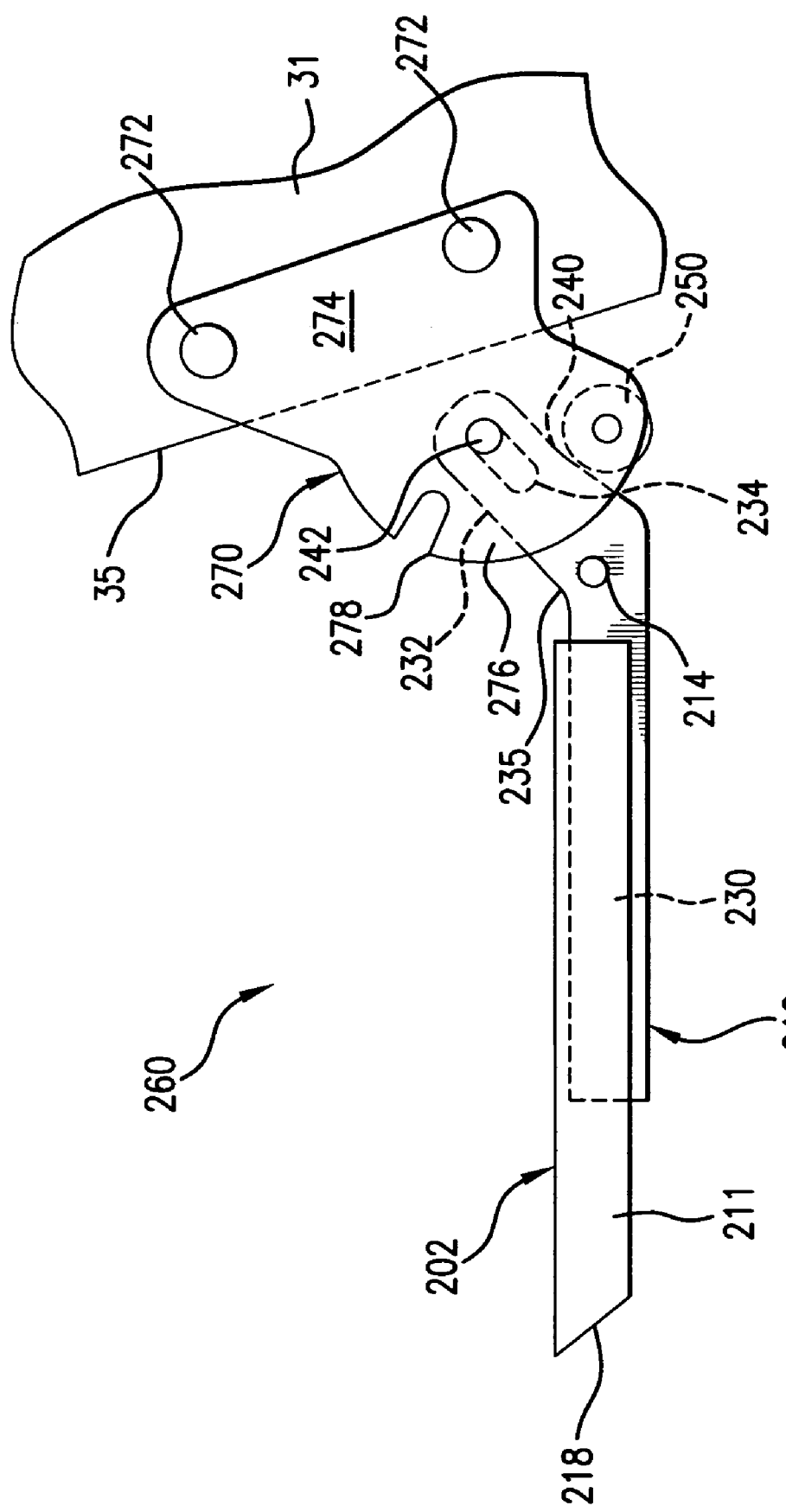
FIG. 16 is a side view of the rider platform of the embodiment of FIG. 12 in an in-use position with an alternative mounting frame, according to an embodiment of the present invention.

FIG. 16 is a side view illustrating a platform system 260 for a self-propelled vehicle (including platform 202 and pivot mechanism 204) having substantially the same features and attributes as platform system 200 of FIGS. 12-15, except replacing mounting frame 206 with mounting frame 270 to accommodate a different shape of vehicle frame. As shown in FIG. 15, pivot mechanism 204 is mounted to mounting frame 270. Mounting frame 270 is fixed to a side surface of a vehicle frame in contrast to mounting frame 206 which is fixed to rear surface 35 of vehicle frame 31 (FIG. 12-15).

As shown in FIG. 16, mounting frame 270 comprises first body portion 274, holes 272 for mounting to vehicle frame 31, second body portion 276, and slot 278 (like slot 209 in FIG. 12-15). First body portion 274 of mounting frame 270 is sized and shaped so that when fixed to a side surface adjacent rear surface 35 of a vehicle frame, pivot mechanism 204 is in a position close to, but spaced from, rear surface 35 of the vehicle frame to achieve the functions and features previously described for platform 202 in association with mounting frame 206 (FIGS. 12-15).

Figure 17:
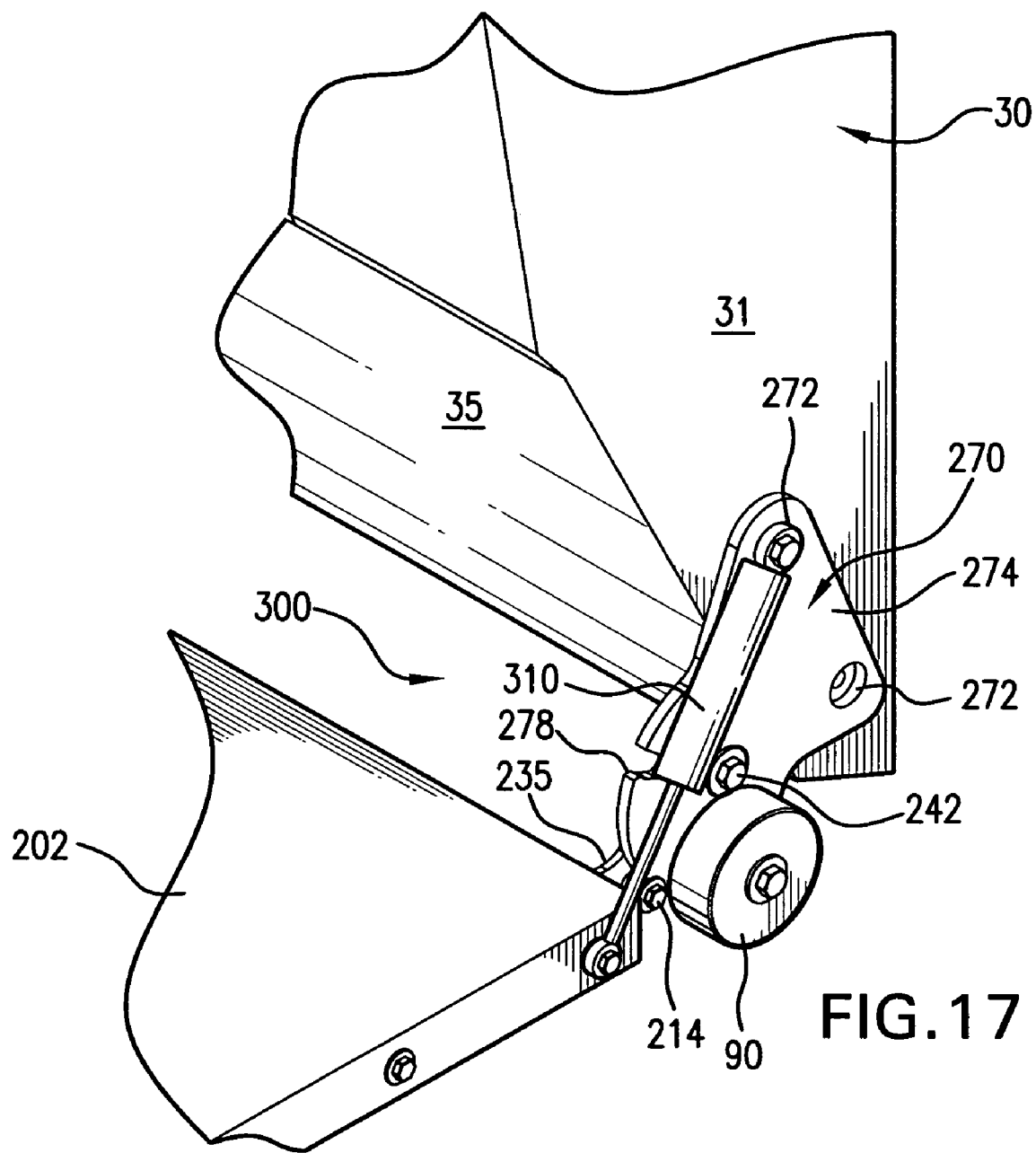
FIG. 17 is a perspective view of a platform system, according to another embodiment of the present invention.

FIG. 17 is a perspective view illustrating a platform system 300, according to an embodiment of the invention. Platform system 300 comprises substantially the same features and attributes as platform systems (including a pivot mechanism and latch mechanism) described in association with FIGS. 1-16, except additionally including a shock-absorbing member 310 as shown in FIG. 17. Shock-absorbing member 310 establishes a link between platform 202 and rear surface 35 of vehicle frame 31 to minimize vibration that would otherwise be transmitted to an operator standing on platform. In one aspect, the shock absorbing link is a piston-cylinder arrangement (as shown) which provides a variable length to member 310 to facilitate pivotal movement of platform 202. In another aspect, the shock absorbing link is an elastomeric member. In other aspects, the shock absorbing link is a spring member or other dampening mechanism.

In addition, each end of member 310 is pivotally mounted relative to platform 202 and relative to rear surface 35 to enable pivoting of platform 202 between the previously described and illustrated in-use and storage positions of platform 202.

In another embodiment, platform system 300 omits a pivot mechanism (such as pivot mechanism 44) and a latch mechanism (such as latch mechanism 46) and relies solely on member 310 to provide a pivoting function for platform 202 and a latching function (via gas pressurization in a cylinder of member 310).

In one aspect, member 310 is mounted at a side of platform 202 as shown in FIG. 117 while in other aspects, member 310 is mounted adjacent a central region of platform between opposite sides of platform 202.

Embodiments of the present invention enable convertible use of self-propelled vehicles in either a walk-behind or ride-on-platform mode by simple pivotal movement of a platform between a generally horizontal position for riding operation and a generally upright, selectively engaged storage position for walk-behind operation. In one aspect, a pivot mechanism enables single hand use to simply flip the platform upward for storage and to flip the platform down for use. The platform can be built as part of the vehicle frame or attached later as a retro-fit assembly.

Although specific embodiments have been illustrated and described herein for purposes of description of the preferred embodiment, it will be appreciated by those of ordinary skill in the art that a wide variety of alternate and/or equivalent implementations may be substituted for the specific embodiments illustrated and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A self-propelled vehicle comprising:
a frame;
a rider support assembly including at least one support element and a platform extending generally outward from the at least one support element, wherein the at least one support element is pivotally mounted, via a pivot mechanism, relative to a rear portion of the vehicle frame, the at least one support element is pivotally movable between a first position in which the platform extends in a generally horizontally orientation from the rear portion of the frame and is spaced above a ground surface to support a rider standing in an elevated position during ride-on operation of the vehicle and a second position in which the at least one support element is in a generally upright position adjacent the rear portion of the frame to enable walk-behind operation of the vehicle, wherein the at least one support element is interposed between the pivot mechanism and the platform to cause the platform to be spaced apart from the pivot mechanism;

a stop mechanism located at the rear portion of the vehicle and configured to releasably engage the at least one support element to prevent pivotal movement of the platform downward beyond the generally horizontal orientation of the first position of the platform, wherein the stop mechanism is independent and separate from the platform, and wherein the stop mechanism is separate and independent of the pivot mechanism; and a latch mechanism disposed on the at least one support element of the rider support assembly, the latch mechanism configured to be automatically releasably engaged at the rear portion of the vehicle frame via an at least one-handed, first manipulation of the platform to releasably secure the platform in the second position and the latch mechanism configured to be automatically disengaged via an at least one-handed, second manipulation of the platform to release the platform from the second position for movement into the first position.

2. The vehicle of claim 1 wherein the latch mechanism comprises:

a hook member pivotally mounted on the at least one support element of the rider support assembly and positioned between the pivot mechanism and the platform, the hook member including a recess; and a securing member disposed at the rear portion of the frame in a location to enable the recess of the hook member to be disengaged from the securing member when the platform is in the first position and to enable the securing member to releasably receive and secure the recess of the hook member when the platform is moved into the second position.

3. The vehicle of claim 1 wherein the stop mechanism is made from an elastomeric material configured to absorb shock between the platform and the frame of the vehicle.

4. The vehicle of claim 1 wherein the stop mechanism is a generally rectangular-shaped block rotatably positionable into at least two positions, in which each respective position causes a different surface of the block to support the at least one support element of the rider support assembly, and wherein each respective different surface of the block extends at a different angle relative to the frame to cause the support to be at a different height relative to the frame to thereby position the operator on the platform at different heights relative to the frame.

5. The vehicle of claim 1 wherein the platform further comprises a vibration-absorbing link interposed between the platform and the frame.

6. The vehicle of claim 1 wherein the frame comprises:

an upper portion having a control module; and a lower portion including a drive mechanism, a front portion, and the rear portion at which the operator is positioned to access the control module, wherein in the second position, the platform is maintained closely adjacent to the rear portion to enable walk-behind use of the vehicle with unobstructed access to the control module.

7. The vehicle of claim 1 wherein the platform includes an inner end connected to the at least one support element and an outer end opposite the inner end, wherein the outer end of the platform includes at least one of a wheel or a roller and the stop mechanism is separate and independent of the respective wheel or roller of the platform and the stop mechanism acts exclusively to limit the downward pivotal movement of the platform.

8. The vehicle of claim 1 wherein the platform includes an inner end connected to the at least one support element and an outer end opposite the inner end, wherein the outer end of the platform is configured without a ground-engaging structure and wherein the one-handed manipulation is performed on the outer end of the platform.

9. The vehicle of claim 1 wherein upon disengagement of the latch mechanism relative to the rear portion of the vehicle frame, the platform pivotally moves from the generally upright, second position into the generally horizontal first position via the action of gravitational forces, and wherein the stop mechanism is positioned to cause releasable engagement of the at least one support element against the stop mechanism via gravitational forces.

10. The vehicle of claim 1 wherein the pivot mechanism includes a first pivot point and a second pivot point with the respective first and second pivot points disposed on opposite sides of the platform, and wherein the latch mechanism is disposed on at least one of the opposite sides of the platform.

11. The vehicle of claim 1, comprising:

a mounting frame secured to the rear portion of the vehicle frame when the latching mechanism is releasably engaged and disengaged, respectively, to the mounting frame to releasably secure and release, respectively, the platform in the respective first and second positions relative to the rear portion of the vehicle frame.

12. The vehicle of claim 1 wherein the stop mechanism is spaced apart from the pivot mechanism.

13. The vehicle of claim 1 wherein the at least one support element is independent of the stop mechanism and freely movable relative to stop mechanism when disengaged relative to the stop mechanism.

14. A self-propelled vehicle comprising:

a frame;

a platform including an inner end pivotally mounted, via pivot mechanism, relative to a rear portion of the vehicle frame, the platform being pivotally movable between a first position in which the platform extends in a generally horizontally orientation from the rear portion of the frame and is spaced above a ground surface to support a rider standing in an elevated position during ride-on operation of the vehicle and a second position in which the platform is removably secured in a generally upright position adjacent the rear portion of the frame to enable walk-behind operation of the vehicle, wherein the pivot mechanism is disposed on each of opposite sides of the platform and comprises a pivot pin and wherein the pivot mechanism also comprises the inner end of the platform including a first slot slidably movable along and rotatable about the pivot pin;

a stop mechanism mounted at the rear portion of the vehicle adjacent to the pivot mechanism, the stop mechanism configured to engage the inner end of the platform to prevent pivotal movement of the platform downward beyond the generally horizontal orientation of the first position of the platform, wherein the stop mechanism is independent and separate from the platform, and wherein the stop mechanism is separate from, and independent of, the pivot mechanism; and a latch mechanism disposed on at least one of the opposite sides of the platform at the inner end of the platform, and configured to be engaged to releasably secure the platform relative to the rear portion of the frame when the platform is in the second position and to be disengaged relative to the rear portion of the frame when the platform is in the first position.

15. The vehicle of claim 14, wherein the latch mechanism comprises:
- a second slot spaced laterally rearward from the pivot pin; and
- a securing pin disposed on the inner end of the platform in a location to be external to the second slot when the platform is in the first position and to be slidably inserted into the second slot when the platform is in the second position.

16. A self-propelled vehicle comprising:
a frame;
a platform including an inner portion pivotally mounted, via a pivot mechanism, relative to a rear portion of the vehicle frame, the platform being pivotally movable between a first position in which the platform extends in a generally horizontally orientation from the rear portion of the frame and is spaced above a ground surface to support a rider standing in an elevated position during ride-on operation of the vehicle and a second position in which the platform is removably secured in a generally upright position adjacent the rear portion of the frame to enable walk-behind operation of the vehicle;
a stop mechanism mounted at the rear portion of the vehicle adjacent to the pivot mechanism, the stop mechanism configured to releasably engage the inner portion of the platform to prevent pivotal movement of the platform downward beyond the generally horizontal orientation of the first position of the platform, wherein the stop mechanism is independent and separate from the platform and wherein the stop mechanism is separate and independent of the pivot mechanism;
at least one mounting member including:
- a first portion mountable to an end surface of the rear portion of the vehicle frame and extending generally parallel to the end surface; and
- a second portion extending outwardly from the first portion of the mounting member, in a plane generally perpendicular to the first portion of the mounting member, to enable the pivotal mounting of the inner portion of the platform at a point spaced from, but adjacent to the end surface.

17. A self-propelled vehicle comprising:
a frame;
a platform including an inner portion pivotally mounted, via a pivot mechanism, relative to a rear portion of the vehicle frame, wherein the platform is pivotally movable between a first position in which the platform extends in a generally horizontally orientation from the rear portion of the frame and is spaced above a ground surface to support a rider standing in an elevated position during ride-on operation of the vehicle and a second position in which the platform is removably secured in a generally upright position adjacent the rear portion of the frame to enable walk-behind operation of the vehicle;
a stop mechanism mounted at the rear portion of the vehicle adjacent to the pivot mechanism, wherein the stop mechanism is configured to releasably engage the inner portion of the platform to prevent pivotal movement of the platform downward beyond the generally horizontal orientation of the first position of the platform, wherein the stop mechanism is independent and separate from the platform, and wherein the stop mechanism is separate and independent of the pivot mechanism;
at least one mounting member including:
- a first portion mountable to a side surface of the frame of the vehicle and extending generally parallel to the side surface of the frame; and
- a second portion extending outwardly and rearwardly from the first portion of the mounting frame, in a plane generally parallel to the first portion, to enable the pivotal mounting of the inner portion of the platform at a point spaced from, but adjacent the rear portion of the vehicle frame.

18. A platform system for a self-propelled vehicle, the platform system comprising:
- a platform including a surface sized and shaped to define an operator zone, the platform comprising an inner portion and an outer portion;
- a pivoting mechanism configured for pivotally mounting the inner portion of the platform relative to a rear portion of the self-propelled vehicle to enable movement of the outer portion between a releasably securable, generally upright storage position adjacent the rear portion of the self-propelled vehicle and a generally horizontal in-use position extending outwardly away from the rear portion of the vehicle to locate the operator zone adjacent a control mechanism of the self-propelled vehicle;
- a limiting mechanism configured to be secured relative to the rear portion of the self-propelled vehicle and configured to prevent pivotal movement of the outer portion of the platform downward below the generally horizontal in-use position,
  - wherein the limiting mechanism is independent of, and separate from, the platform, and
  - wherein the limiting mechanism is independent of, and separate from, the pivot mechanism; and
- a latch mechanism at least partially disposed on the inner portion of the platform and configured to be automatically releasably engaged relative to the rear portion of the vehicle frame via one-handed manipulation of the outer portion of the platform to releasably secure the platform in the generally upright storage position and configured to be automatically disengaged relative to the rear portion of the vehicle frame via one-handed manipulation of the outer portion of the platform to release the platform from the upright storage position for movement into the in-use position.

19. The platform system of claim 18 wherein the limiting mechanism is spaced apart from the pivot mechanism and wherein the pivoting mechanism comprises:
- a mounting frame securable onto the rear portion of the self-propelled vehicle;
- a first portion disposed on the mounting frame to enable pivotal mounting of the platform relative to the rear portion of the self-propelled vehicle; and
- a second portion disposed on the platform to enable releasable securing of the platform in the upright storage position.

20. A platform system comprising:
- a platform including a surface sized and shaped to define an operator zone;
- a positioning mechanism configured to pivotally mount the platform relative to a rear portion of a self-propelled vehicle such that the platform is movable between a releasably securable, generally upright storage position adjacent the rear portion of the vehicle and a generally horizontal in-use position extending outwardly and rearwardly away from the rear portion of the vehicle to locate the operator zone adjacent a control mechanism of the self-propelled vehicle, wherein the positioning mechanism comprises:

a mounting frame securable onto the rear portion of the self-propelled vehicle;

a first portion disposed on the mounting frame to enable the pivotal mounting of the platform relative to the rear portion of the self-propelled vehicle;

a second portion disposed on the platform to enable the releasable securing of the platform in the storage position; and a first reciprocating portion disposed on at least one of the mounting frame or the platform, the first reciprocating portion sized and positioned to releasably engage the second portion when the platform is in the upright storage position; and a limiting mechanism configured to be secured in a fixed position relative to the rear portion of the self-propelled vehicle and configured to prevent pivotal movement of the platform downward below the generally horizontal in-use position, wherein the limiting mechanism is independent of, and separate from, the platform and wherein the limiting mechanism is independent of, and separate from, the positioning mechanism.

21. The platform system of claim 20 wherein the second portion comprises a hook member rotatably mounted to the platform with the hook member including a first slot, and wherein the first reciprocating portion is mounted on the mounting frame and comprises a second pin configured to releasably receive the first slot of the hook member.

22. The platform system of claim 20 wherein the first portion comprises: a first pin and a second, closed elongate slot defined in a support arm of the platform in which the first pin is pivotally and slidably movable, wherein the second portion comprises a third pin, and wherein the first reciprocating portion is disposed on the mounting frame and comprises a third open slot configured to slidably receive the third pin.

23. The vehicle of claim 20 wherein when the platform is in the generally upright storage position, the platform extends generally parallel to an end surface of the rear portion of the vehicle frame.

24. A self-propelled vehicle comprising:

a frame; and a platform pivotally mounted, via a pivot pin, to a rear portion of the vehicle frame and pivotally movable between a first position in which the platform extends generally horizontally from the rear portion of the frame to support a rider during operation of the vehicle and a second position in which the platform is removably secured in a generally upright position adjacent the rear portion of the frame to enable walk-behind operation of the vehicle, wherein the platform comprises a support arm including a first portion positioned underneath the platform and a second portion forming a generally obtuse angle relative to the first portion, the second portion extending away from the platform inwardly toward the frame of the vehicle for pivotal mounting to the pivot pin, wherein the second portion of the support arm rests on top of the stop mechanism when the platform is in the first position.

25. A self-propelled vehicle comprising:

a frame including a rear portion;

a platform pivotally mounted, via a pivot mechanism, to the rear portion of the vehicle frame wherein the pivot mechanism includes a pivot pin located adjacent to the rear portion of the frame on each of opposite sides of the platform, wherein the platform is pivotally movable between a first position in which the platform extends generally horizontally from the rear portion of the frame to support a rider during operation of the vehicle and a second position in which the platform is removably secured in a generally upright position adjacent the rear portion of the frame to enable walk-behind operation of the vehicle;

a latch mechanism disposed on at least one of the opposite sides of the platform, and configured to be engaged to releasably secure the platform relative to the rear portion of the frame when the platform is in the second position and to be disengaged relative to the rear portion of the frame when the platform is in the first position, wherein the pivot mechanism includes a stop mechanism positioned adjacent to, and spaced from, the pivot pin to limit downward pivoting movement of the platform relative to the frame when the platform is in the first position, and wherein the stop mechanism is a generally rectangular-shaped block rotatably positionable into at least two positions, in which each position causes a different surface of the block to support the pivot arm, and each different surface being at a different angle relative to the frame, to cause the support to be at a different height relative to the frame to thereby position the operator on the platform at different heights relative to the frame.

26. A method of supporting a rider behind a self-propelled loader, the method comprising:

mounting, via a pivot mechanism, at least one support arm of a platform relative to a rear portion of the self-propelled loader to enable positioning the platform in a generally upright storage position to operate the loader in a walk-behind mode or positioning the platform in a generally horizontal position to operate the loader in a ride-on mode in which a user stands on the platform behind the loader;

providing the walk-behind mode of operation of the loader via releasably securing the platform in the generally upright position adjacent to, and relative to, the rear portion of the loader via a hands-free releasable engagement of a latch mechanism relative to the rear portion of the loader, and including arranging the latch mechanism to be located on at least one of the rear portion of the loader and the at least one support arm;

providing the ride-on mode of operation of the loader, when the latch mechanism is disengaged, via preventing downward pivotal movement of the platform beyond the generally horizontal position by releasably engaging the at least one support arm of the platform via a stop mechanism, and including arranging the stop mechanism to be located at the rear portion of the loader and wherein the stop mechanism is separate from, and independent of, the pivot mechanism; and switching between the walk-behind mode and the ride-on mode via selectively pivotally moving the platform, via a single-handed manipulation of an outer end of the platform, between the releasably securable generally upright position and the generally horizontal position.

27. The method of claim 26 wherein arranging the latch mechanism to be located on the rear portion of the loader comprises:

providing the latch mechanism on a mounting frame interposed between the rear portion of the loader and the at least one support arm.

28. The method of claim 26 wherein arranging the stop mechanism to be located at the rear portion of the loader comprises:

positioning the stop mechanism, on a mounting frame attached to the rear portion of the loader, to releasably engage an inner portion of the at least one support arm.

29. The method of claim 26 wherein providing the ride-on mode of operation of the loader comprises:

arranging the stop mechanism to be spaced apart from the pivot mechanism.

30. The method of claim 26 wherein switching between the walk-behind mode and the ride-on mode via the single-handed manipulation comprises:

additionally using a second hand, at the same time as the single hand, to perform the manipulation of the outer end of the platform.

* * * * *